UNITED STATES PATENT OFFICE.

WLADIMIR W. BUIMISTROFF, OF WASHINGTON, DISTRICT OF COLUMBIA.

DIRECTION-INDICATOR FOR CLOSED AUTOMOBILES.

1,379,245.   Specification of Letters Patent.   Patented May 24, 1921.

Application filed February 7, 1918. Serial No. 215,862.

*To all whom it may concern:*

Be it known that I, WLADIMIR W. BUIMISTROFF, a citizen of Russia, and residing at Washington, District of Columbia, have invented certain new and useful Improvements in Direction-Indicators for Closed Automobiles, of which the following is a specification.

The present invention relates to a direction indicator for motor vehicles and more particularly to such an indicator for closed automobiles.

The principal objects of the invention are to provide an indicating device which may be secured to a closed car in such a manner that the weather-tightness of the car is not affected; to provide such a device adapted to be secured on the outside of a closed car and operated from the inside; to provide an indicating device of simple structure which may be manufactured at a low cost; and generally to provide an improved construction.

Other objects and features of novelty will be apparent from the description taken in connection with the drawings, in which:

Figure 1 is a perspective view of a portion of a closed automobile illustrating the present invention as applied thereto;

Fig. 2 is a view of the indicator and windshield as seen from the front side of the automobile;

Fig. 3 is a longitudinal sectional view through the indicating device;

Fig. 4 is a sectional view taken substantially on the line 4—4 of Fig. 2;

Fig. 5 is a transverse sectional view taken substantially on the line 5—5 of Fig. 3.

Referring to the drawings, as shown the indicating device proper comprises the two flat housings 10 and 11 connected at their inner end walls by the tubular member 12. A flat signal 13 is slightly mounted in the housing 10 and a similar signal 14 is slidingly mounted in the housing 11, these two signals being connected by the rod 15 extending through the tubular member 12. As shown in Fig. 3 the signals are in midposition, that is to say both of them are retracted within their respective housings. When the rod 15 is moved to the left as viewed in this figure the signal 13 is projected at the left and the signal 14 further retracted within the housing 11 until it strikes the inner end wall, this housing being of such length that the signal 14 may slide to the left a sufficient distance to permit the signal 13 to be projected at the other side. In a similar manner the housing 10 is constructed so that the signal 14 may be projected at the right.

The indicator is adapted to be mounted at the front side of the wind-shield, as shown in Fig. 1, by any suitable means such as the clips 16. For the purpose of operating the indicator from the inside of the car a short shaft 17 having a handle 18 extends through an aperture 19 in the wind-shield and into a circular casing 20 carried by the tubular member 12. A grooved wheel 21 is arranged within the casing and mounted on the said shaft 17. In assembling these parts the shafts and handle must be inserted in the aperture 19 from the inside of the car and in order to hold it against displacement it is formed with the shoulder 22 which abuts against one side of the casing 20 and has the nut 23 at the other side. A leather or felt washer 24 may be arranged between the wind-shield and the casing 20. The wheel 21 may frictionally engage the rod 15 so that when it is rotated the rod will be reciprocated. Preferably, however, a flexible connector 25 is secured to the rod 15 as at 26 and passes around the wheel 21 and thence along the rod, being secured thereto as at 27 on the opposite side of the wheel from the point 26. If desired, this connector may have one point thereof secured to the wheel 21 as at 28 so that there will be no slipping.

In the operation of the device it is merely necessary to grasp and turn the handle 18 in order to project one or the other of the signals 13 and 14. If the handle is turned toward the left to the position indicated in dotted lines in Fig. 2 then the left hand signal will be projected. If it is turned in the reverse direction then the right hand signal will be projected. Thus the position of the handle 18 shows the adjustment of the indicating device.

In applying the device to a closed automobile it is seen that the indicator is located on the outside of the wind-shield and consequently there are no apertures or openings to destroy the weather-tightness of the car. The single hole 19 formed in the wind-shield is securely protected from the weather by the casing 20 and the washer 24. In addition to the feature just mentioned the indicator may be manufactured at a small cost as its structure is so simple and is adapted to be made from stamped parts. Preferably the signals 13 and 14 are coated at least on the rearward side with a phosphorescent paint or other substance which will render the signal luminous.

Having thus described the invention what is claimed as new and desired to be secured by Letters Patent is:—

1. An automobile direction indicator comprising a flat housing having a tube connected thereto, a circular housing connected to the tube, a signal slidable in said flat housing, a rod at one end connected to the signal slidable in the tube, means at the other end of said rod for limiting the outward movement of the signal, a shaft extending through the circular housing having a handle at one end and a wheel within the housing connected to the rod.

2. An automobile direction indicator comprising a pair of flat housings with inner end walls, a tube connecting said housings, a circular housing connected to the tube, a signal slidable in each of said flat housings, and of approximately half the length thereof; a rod disposed in said tube and connected at each end to one of said signals, a shaft extending through the circular housing having a handle at one end, and a wheel mounted on said shaft within the circular housing operatively connected to the rod to slide the rod when the wheel is rotated, each of said inner end walls forming a stop for the corresponding signal to limit the extent of outward motion of the other signal.

In testimony whereof I affix my signature.

WLADIMIR W. BUIMISTROFF.